US010356050B1

(12) United States Patent
Kumar et al.

(10) Patent No.: US 10,356,050 B1
(45) Date of Patent: Jul. 16, 2019

(54) MITIGATION OF DATA LEAKAGE IN HTTP HEADERS

(71) Applicant: Amazon Technologies, Inc., Seattle, WA (US)

(72) Inventors: Lokesh Kumar, Dublin (IE); Marios Zindilis, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 374 days.

(21) Appl. No.: 15/270,924

(22) Filed: Sep. 20, 2016

(51) Int. Cl.
*H04L 29/06* (2006.01)
*H04L 29/08* (2006.01)

(52) U.S. Cl.
CPC .......... *H04L 63/04* (2013.01); *H04L 63/0421* (2013.01); *H04L 63/168* (2013.01); *H04L 63/20* (2013.01); *H04L 63/306* (2013.01); *H04L 67/02* (2013.01)

(58) Field of Classification Search
CPC ....................................................... H04L 63/04
See application file for complete search history.

(56) References Cited

U.S. PATENT DOCUMENTS

| 7,080,158 B1* | 7/2006 | Squire | H04L 67/2814 370/389 |
| 2006/0136294 A1* | 6/2006 | Linden | G06Q 30/0257 705/14.47 |
| 2009/0003315 A1* | 1/2009 | Devdhar | H04L 65/104 370/352 |
| 2011/0126290 A1* | 5/2011 | Krishnamurthy | G06F 21/6263 726/26 |
| 2011/0208850 A1* | 8/2011 | Sheleheda | G06F 17/30867 709/223 |

OTHER PUBLICATIONS

"Configuration Directives," grok.org.uk <http://www.grok.org.uk/tools/mpp/> [retrieved Sep. 19, 2016], 1 page.
"HTTP Referer," Wikipedia, The Free Encyclopedia, Aug. 23, 2016, <https://en.wikipedia.org/wiki/HTTP_referer> [retrieved Sep. 19, 2016], 4 pages.

(Continued)

*Primary Examiner* — Simon P Kanaan
(74) *Attorney, Agent, or Firm* — Davis Wright Tremaine LLP

(57) ABSTRACT

A web application on a client computer system submits a web request to a destination Web server via a network application programming interface. A web request scrubber is installed on the client computer system between the network application programming interface and a network interface of the client computer system. The web request scrubber intercepts the web request and determines if an HTTP referer field is present. Based at least in part on the intended destination of the web request, the web request scrubber identifies and applies an applicable scrubbing policy to the information in the HTTP referer field. The web request scrubber removes or modifies some or all of the information in the HTTP referer field in accordance with the applicable scrubbing policy, and forwards the modified web request to the destination Web server via the network interface of the client computer system.

21 Claims, 10 Drawing Sheets

(56) References Cited

OTHER PUBLICATIONS

May, D.T., "Preventing the Referer HTTP Header From Being Sent to Google Analytics," © 2016 Google, <https://www.en.advertisercommunity.com/t5/Code-Implementation/Preventing-the-Referer . . . > [retrieved Sep. 19, 2016], 9 pages.

"Scrubbing Your Referrer . . . ," Prosper202 Forum, <http://prosper.tracking202.com/forum/12/21/scrubbing-your-referrer> [retrieved Sep. 19, 2016], 7 pages.

McClintock, J.A., and G.N. Stathakopoulos, "Countering Service Enumeration Through Imposter-Driven Response," U.S. Appl. No. 14/108,238, filed Dec. 16, 2013.

\* cited by examiner

MITIGATION OF DATA LEAKAGE IN HTTP HEADERS

BACKGROUND

Computer networks are a ubiquitous feature in contemporary computing environments. In many data centers, computer systems within a data center are connected to each other via an internal computer network. The internal computer network is often connected to one or more external networks via one or more routers. Some of the external networks, such as the Internet, may not be under the control of the owner of the data center. Therefore, when a computer system within the internal network connects to an external computer system on an external network, it is important to limit the information revealed to the external computer system. In addition to limiting the data explicitly transmitted from within the internal computer network to the external computer network is important, it is also important to control network metadata transmitted from within the internal computer network to systems on the external computer network.

BRIEF DESCRIPTION OF THE DRAWINGS

Various techniques will be described with reference to the drawings, in which.

DETAILED DESCRIPTION

Figure 1:
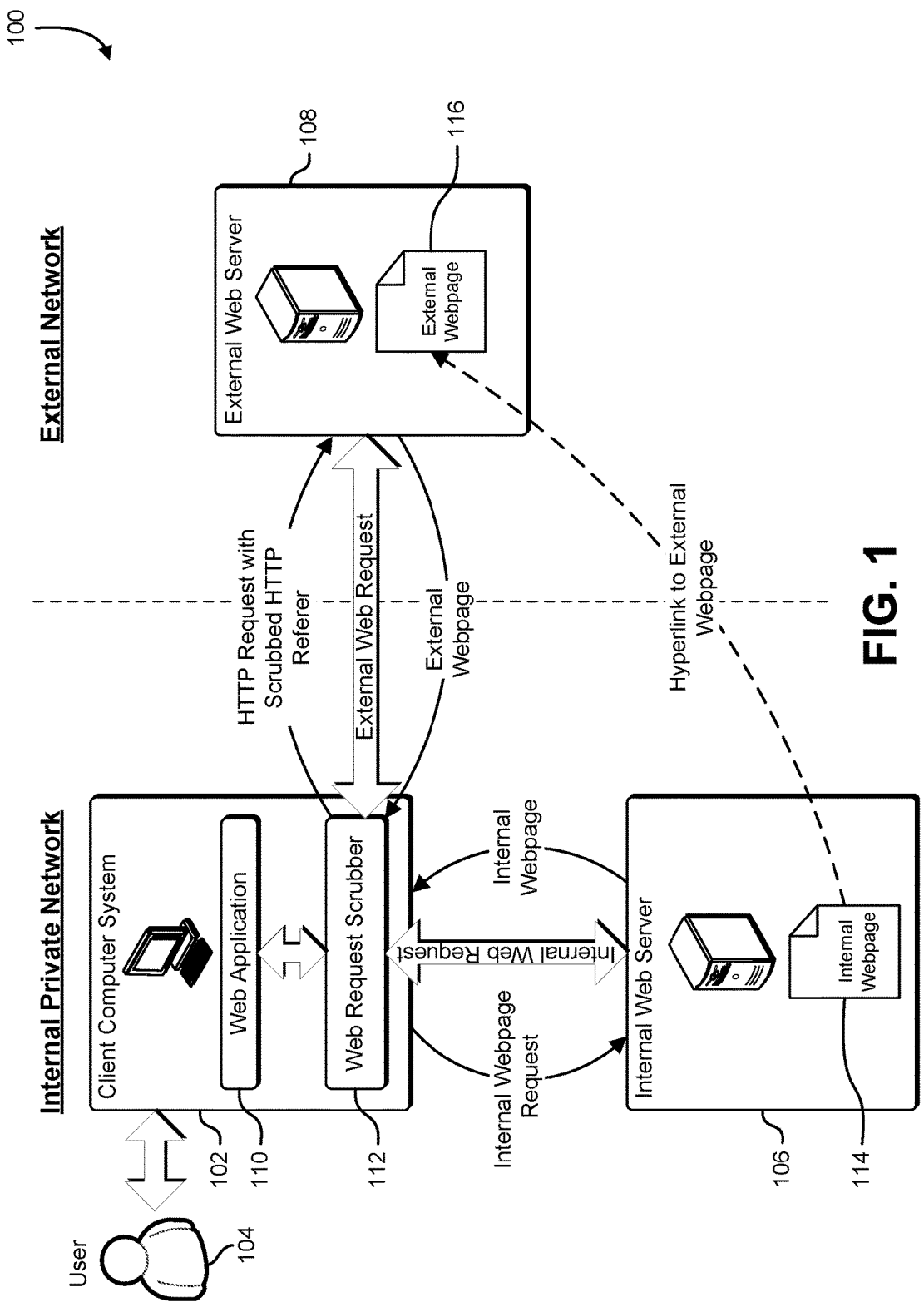
FIG. 1 shows an illustrative example of an environment in which various embodiments may be practiced.

The current document describes a system that prevents the unintentional leakage of data in HTTP requests by obscuring information that may reveal the origins of the request. As part of an HTTP request, a client connected to an internal private network can unintentionally leak information describing characteristics of the internal network to computer systems connected to an external network such as the Internet. When a client computer system operating within the private network retrieves an internal webpage from an internal Web server within the private network, the internal webpage may include a reference to information located on an external server residing on an external network. For example, the internal webpage may include a hyperlink to a webpage located on an external Web server which is connected to the Internet.

If a user operating the client computer system clicks on the hyperlink, a hypertext transfer protocol ("HTTP") request is generated by the browser running on the client computer system and the request is submitted to the external Web server. The HTTP request includes an HTTP referer field. The HTTP referer field contains information identifying the internal Web server, and may include the full name of the internal Web server as well as parameters encoded in the URL. In certain situations, information in the HTTP referer field may be used by an attacker to identify an organizational structure, owner, or network topology associated with the internal Web server. In some situations, information in an HTTP referer field may be used by potential attacker to identify part of the topology of the internal network, or the information may be used to conduct a social engineering attack against the owner of the internal private network.

The current document describes a web request scrubber that identifies and removes information from the HTTP referer field. The web request scrubber is a network traffic monitoring component that resides on a client computer system between a network application programming interface ("API") and the network interface. When an application running on the client computer system generates a web request, the application calls the network application programming interface to send the request to an intended destination Web server. The web request scrubber intercepts the web request, and extracts the intended destination and contents of the HTTP referer field from the request. If the request does not include an HTTP referer field, or if the HTTP referer field is empty, the web request is passed by the web request scrubber to the network interface, and the network interface forwards the request to the intended destination Web server.

In some examples, if the request includes information in an HTTP referer field, the web request scrubber queries a request scrubber database to identify a scrubbing policy based on the identity of the intended destination Web server. The request scrubber database maintains a whitelist, a graylist, and a blacklist. Each list defines a set of potential destinations by identifying a number of destination names, destination addresses, destination address ranges, and name wildcards. If the intended destination Web server matches any of the conditions of a particular list, the intended destination Web server is said to be a member of the particular list. The web request scrubber determines whether the intended destination Web server is a member of the whitelist, the graylist, the blacklist, or no list. Each list is associated with a policy. The policy describes how information in the HTTP referer field is to be modified, if at all.

In some examples, if the web request scrubber determines that the intended destination Web server is a member of the whitelist, the web request scrubber determines that the server is a trusted server, and the HTTP referer field is not modified, and the web request is forwarded to the intended destination Web server via the network interface. If the web request scrubber determines that the intended destination Web server is a member of the graylist, the web request scrubber determines that the server is a somewhat untrusted server, information in the HTTP referer field may be limited or obscured. In some implementations, the HTTP referer field is modified by substituting a fully qualified domain name, if present, with a truncated domain name. For example, fully qualified domain name such as secret.server.example.com may be replaced with simply example.com. Particular parameters embedded in the HTTP referer field, such as embedded passwords, usernames, cryptographic keys, or cookies may be identified and removed. In some implementations, parameters embedded in the HTTP referer field may be removed entirely. If the web request scrubber determines that the intended destination Web server is a member of the blacklist, the web request scrubber determines that the server is not trusted or hostile, and information in the HTTP referer field may be removed or even corrupted to mislead a hostile attacker. In some implementations, the HTTP referer field is removed from the request. In another implementation, the HTTP referer field is replaced with a pseudorandom domain name such as for random strings separated by a period. In yet another implementation, the HTTP referer field is modified to point to a tripwire URL or a security honeypot that, when accessed by an attacker, alerts an administrator or triggers other defensive action. The information in the HTTP referer field may be modified to include information that can be traced to the intended destination of the request, or to the particular request. For example, a cookie, a code, a username, a password, or other piece of information usable by an attacker may be added to the HTTP referer field. If an attacker attempts to use the added information, and reveals the information to the owner of the internal network as part of an attack, the owner of the internal network can use the information to trace the source of the attack back to the intended destination of the request. If the web request scrubber determines that the intended destination Web server is not a member of any list, a default policy may be applied. Information embedded in the HTTP referer field may include information designed to lure an attacker into a tripwire, honey pot, or other trap such as those described in U.S. patent application Ser. No. 14/108,238, filed Dec. 16, 2013, entitled "COUNTERING SERVICE ENUMERATION THROUGH IMPOSTER-DRIVEN RESPONSE," the content of which is incorporated by reference herein in its entirety.

In some examples, if the web request scrubber determines that the intended destination Web server is not a member of any list, the web request scrubber attempts to define a policy for the intended destination by sending a series of requests with increasing levels of HTTP referer information. In one implementation, the web request scrubber sends a request to the intended destination without HTTP referer information. If the intended destination Web server fulfills the request without error, the web request scrubber defines a policy for the intended destination that scrubs HTTP referer information from future requests to the intended destination. If the intended destination Web server responds to the request with an error, the web request scrubber sends a request to the intended destination with limited HTTP referer information. If the intended destination Web server fulfills the request without error, the web request scrubber defines a policy for the intended destination that limits the HTTP referer information provided in future requests to the intended destination. If the intended destination Web server responds to the request with an error, the web request scrubber sends a request to an administrator to add the intended destination Web server to a whitelist.

FIG. 1 shows an illustrative example of an environment in which various embodiments may be practiced. A system diagram 100 illustrates a number of network connected computer systems. A client computer system 102 operated by user 104 and an internal Web server 106 are connected to an internal private network. An external Web server 108 is connected to an external network such as the Internet. The client computer system 102 may be a personal computer system, a laptop computer system, a tablet computer system, a handheld device, a cellular phone, or other computing device capable of generating and submitting a web request. The client computer system 102 is connected to the internal private network via a network interface. The network interface adapter may implement an Ethernet interface, a Wi-Fi interface, a Bluetooth interface, or other network interface technology. The client computer system 102 hosts the web application 110. The web application 110 is capable of generating HTTP web requests such as requests for webpages or other web content. In some implementations, the web application 110 is a web browser and the user 104 operates the web browser to retrieve webpages from the internal Web server 106 and the external Web server 108.

A web request scrubber 112 is installed between the network API and the network interface of the client computer system 102. When the web application 110 generates a web request and attempts to transmit the web request to an intended recipient using a network API on the client computer system 102, the web request scrubber 112 intercepts the web request, and determines whether sensitive information is contained in the web request. If the web request scrubber 112 determines that sensitive information is contained in the web request, the web request scrubber 112 modifies the information based at least in part on the intended destination of the request.

The internal Web server 106 is a server computer system located on the internal private network that is accessible to the client computer system 102. The internal Web server 106 hosts an internal website that includes a number of webpages and other web resources. The internal web site includes an internal webpage 114. The internal webpage 114 may include information on the page itself such as text, images, multimedia content, and contact information. In addition, the internal webpage 114 may include links that reference information on other pages of the internal web site as well as information on other web sites, both internal and external. In the example shown in FIG. 1, the internal webpage 114 includes a hyperlink that references an external webpage 116 on the external Web server 108. The external Web server 108 is a server computer system located on the external network. The external Web server 108 may be accessible to the public, or maybe operated by an entity other than the owner of the internal private network.

In the absence of the web request scrubber 112, it is possible for the user 104 to unknowingly provide sensitive information to the external Web server 108. When operating a web browser on the client computer system 102, the user 104 sends an internal page request to the internal Web server 106. The internal Web server 106 retrieves the internal webpage 114 and provides the internal webpage 114 to the user 104 via the web browser. The internal webpage 114 includes a hyperlink to the external webpage 116 located on the external Web server 108. If the user 104 clicks the hyperlink displayed in the web browser, the web browser generates a web request in the form of an HTTP request for the external webpage 116, and attempts to send the web request to the external Web server 108. The web request includes an HTTP referer field. The HTTP referer field includes the identity of the source of the hyperlink selected by the user. For example, the HTTP referer field may include the fully qualified domain name of the internal Web server 106, as well as parameters included with the URL. For example an HTTP referer might include the information "https://www.google.com/search?q=http+referer." For an internal private network, the fully qualified domain name and URL parameters may reveal usernames, machine names, company organizational structure, project names, internal network structure, or other sensitive information that may be used by an outside attacker.

In various examples, the web request scrubber 112 identifies potentially sensitive information contained in the HTTP referer field of an HTTP request header. Based at least in part on the nature of the information and the identity of the intended recipient for the web request, the web request scrubber 112 modifies or removes the potentially sensitive information before the web request is forwarded to the external Web server 108. In some implementations, the web request scrubber 112 determines whether the intended recipient of the HTTP request is within the internal private network or within an external network. If the intended recipient of the HTTP request is located within the internal private network, the web request scrubber does not modify the HTTP referer field, and forwards the web request to the internal Web server. If the intended recipient of the HTTP request is not located within the internal private network, the web request scrubber may modify the HTTP referer field to limit the information exposed to the intended recipient.

The web request scrubber 112 may limit the information exposed via the HTTP referer field and a number of ways. In some examples, the web request scrubber 112 removes parameters from the HTTP referer field. In another example, the web request scrubber 112 truncates a fully qualified domain name in the HTTP referer field by removing the hostname from the fully qualified domain name. In yet another example, the web request scrubber 112 replaces the name of the referrer with generic information such as the domain name of the company (for example, "company.com").

Figure 2:
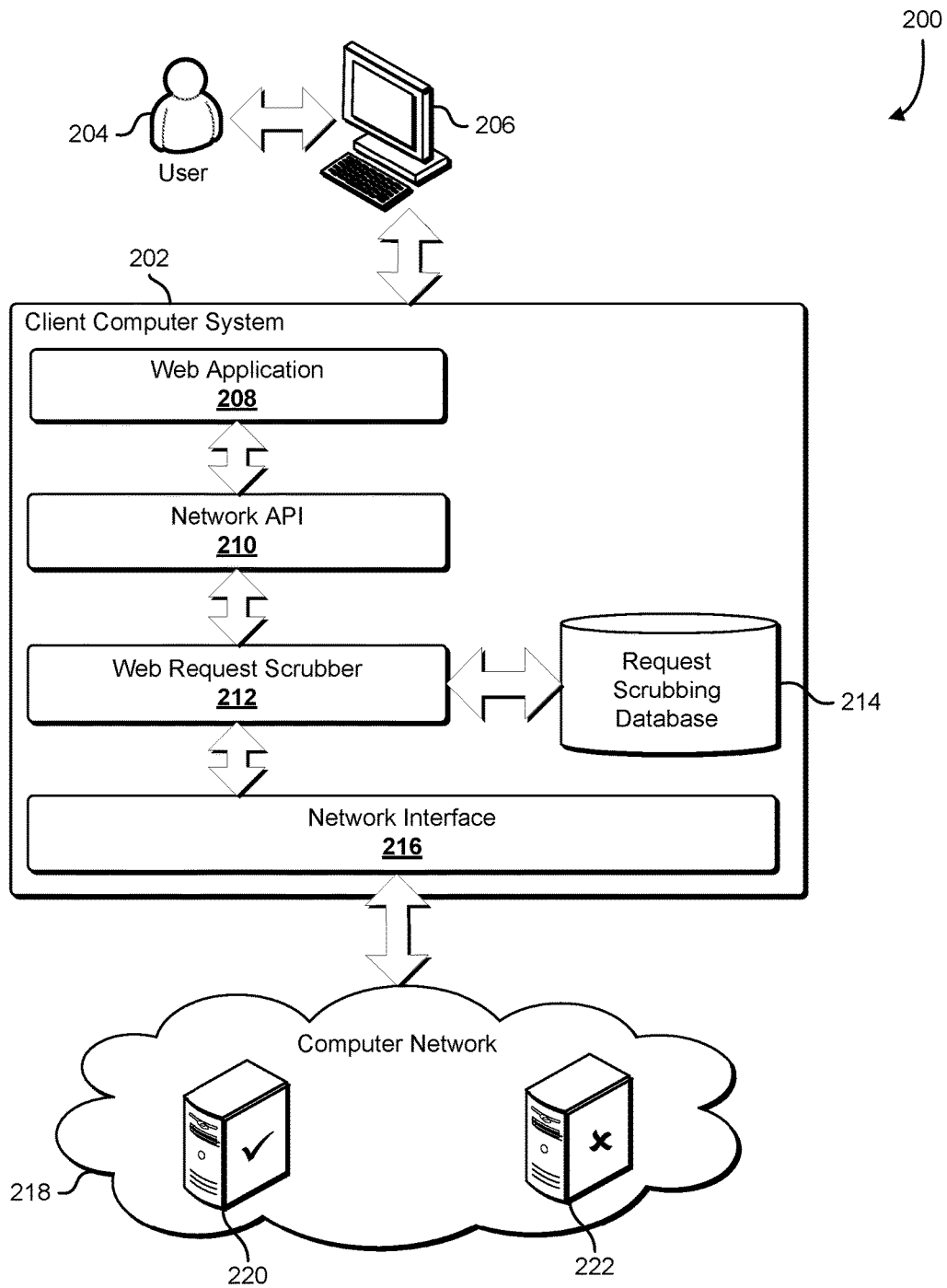
FIG. 2 shows an illustrative example of a client computer system that includes a web request scrubber.

FIG. 2 shows an illustrative example of a client computer system that includes a web request scrubber. A block diagram 200 shows a structure of a client computer system 202 that generates and submits web requests. The client computer system 202 may be a personal computer system, a tablet computer system, a laptop computer system, a handheld device, a set-top box, a network connected watch, or network appliance. A user 204 uses a user interface 206 to operate the client computer system 202. In some examples, the user interface is a display screen, keyboard, and a mouse. In another example, the user interface is a touchscreen interface. In another example, the user interface is a watch display. In another example, the user interface may include a voice control interface.

The client computer system 202 includes a web application 208. In some examples, the web application 208 is a standalone web browser such as Microsoft Internet Explorer, Apple Safari, Opera, or Firefox. In another example, the web application 208 is an application that includes web-browser functionality, and the web application performs other functions in addition to sending and receiving web requests. The web application 208 interacts with Web servers via a network API 210. The network API is a programming interface accessible to the web application 208 that allows the web application 208 to send and receive data over a computer network 218. In some examples, the network API 210 is a sockets interface. In another example, the network API 210 is a Winsock interface. In yet another example, the network API 210 is a web request interface.

A web request scrubber 212 monitors outgoing web requests submitted via the network API 210 for the presence of an HTTP referer field. If the web request scrubber 212 detects a web request containing an HTTP referer field, the web request scrubber 212 identifies the intended destination of the web request and queries a request scrubbing database 214 to determine an applicable scrubbing policy to apply to the information contained in the HTTP referer field. In some examples, the request scrubbing database 214 includes a whitelist. The whitelist identifies a set of request destinations that are permitted to receive the information contained in the HTTP referer field. The set of request destinations may be specified by a combination of host names, network addresses, host name wildcards, network address ranges, or subnets.

The request scrubbing database 214 may be implemented using a database, data store, in-memory data structure, or table accessible to the client computer system 202. In some implementations, the request scrubbing database 214 is stored on a memory, disk drive, or nonvolatile storage device on the client computer system 202. In other implementations, the request scrubbing database 214 is maintained on a remote server, and is accessible to a plurality of client computer systems. An administrator may manage the request scrubbing database on the remote server via an administrative console. At least a portion of the request scrubbing database 214 may be replicated from the remote server to a data store on the client computer system 202. If the remote data store becomes unavailable or inaccessible to the client computer system, the client computer system may use the local copy of the request scrubbing database to perform web-request-scrubbing operations.

If the intended destination is represented in the whitelist, the web request scrubber 212 forwards the web request to the intended destination without modifying the information in the HTTP referer field. If the intended destination is not represented in the whitelist, the web request scrubber 212 modifies the information in the HTTP referer field. In some examples, the information is modified by removing parameters from the HTTP referer field. In another example, information is modified by removing the hostname from a fully qualified domain name in the HTTP referer field. In yet another example, information in the HTTP referer field is replaced with a company domain name. In some implementations, the web request scrubber 212 maintains a number of lists identifying a number of sets of intended destinations, in association with a policy describing how the HTTP referer field is modified if the intended destination is a member of an individual list. The number of lists may include a whitelist, a graylist, a blacklist, and a default list. The web request scrubber 212 is installed between the network API 210 and a network interface 216. The network interface 216 may be a network card with an Ethernet connection, a wireless network interface, a Bluetooth network interface, a USB network interface, or other interface to a physical network medium.

In the example shown in FIG. 2, the first Web server 220 is identified in a whitelist in the request scrubbing database 214. A second Web server 222 is not identified in the whitelist. When the user 204 sends a web request using the web application 208 to the first Web server 220, the web request scrubber 212 passes the web request including any HTTP referer information to the first Web server 220 without modification. When the user 204 sends a web request using the web application 208 to the second Web server 222, the web request scrubber 212 identifies information contained in any HTTP referer field, and modifies the information in accordance with a policy retained in the request scrubbing database 214. In many examples, the web request scrubber 212 removes the parameters from the HTTP referer field, and replaces a fully qualified host name with a truncated hostname or company domain name.

Figure 3:
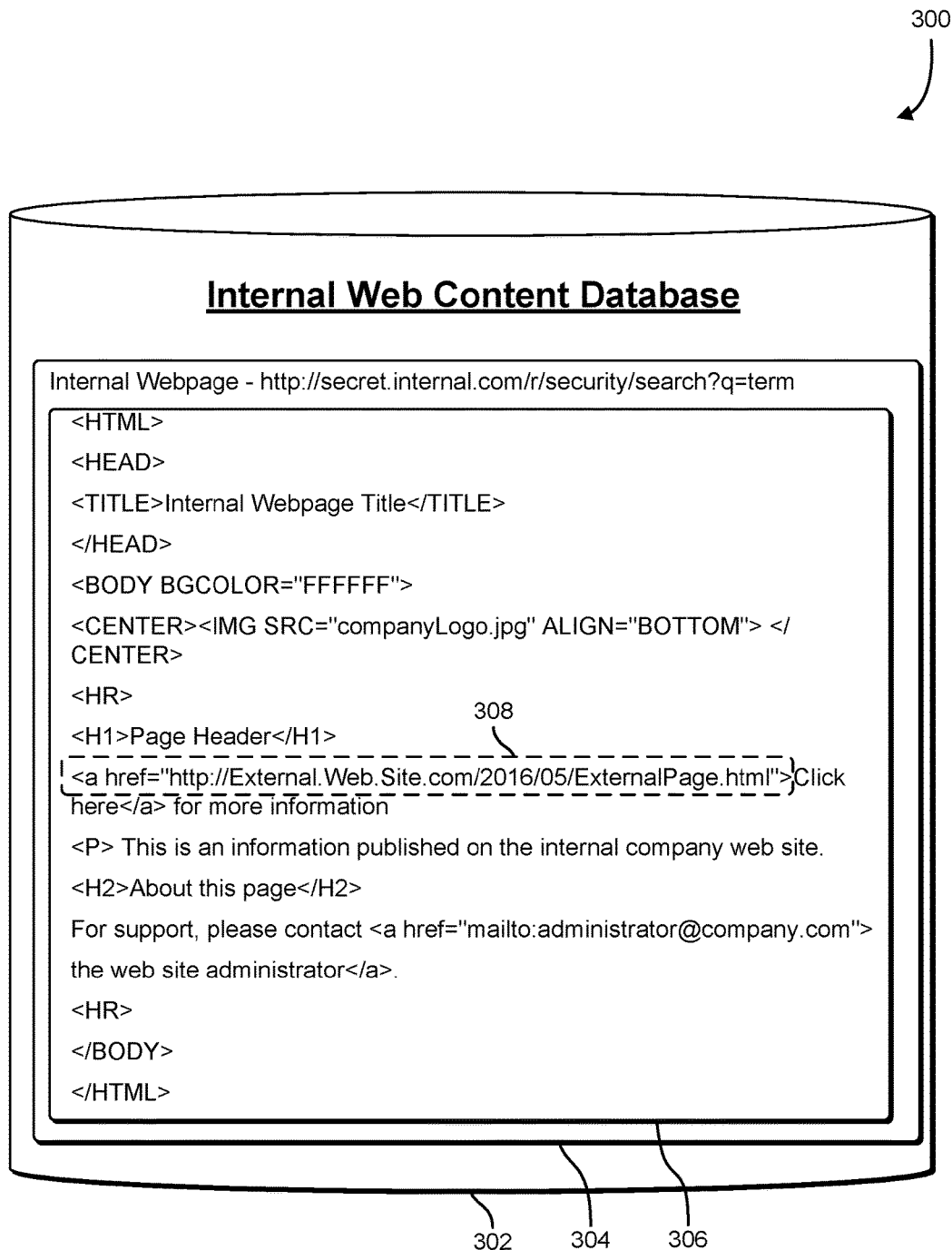
FIG. 3 shows an illustrative example of an internal webpage stored in a web content database associated with an internal website.

FIG. 3 shows an illustrative example of an internal webpage stored in a web content database associated with an internal website on an internal network. A diagram 300 shows a data store 302 that retains an internal web content database. The data store 302 may be a disk drive, online storage service, or memory device accessible to an internal Web server. The data store 302 is used by the internal Web server to hold web content. The web content includes an internal webpage 304 that is retained in a file on the data store. The internal webpage is implemented with HTML code 306 that is stored in the file.

The HTML code 306 includes a variety of tags and data that describe the internal webpage 304. When submitted to a browser running on a client computer system within the internal network, the browser interprets the HTML code 306 to produce a human readable representation of the internal webpage 304 on the client computer system. The HTML code 306 includes a link 308. The link 308 references an external website "External.Web.Site.com" which is located outside the internal network. A clickable representation of the link 308 is presented as part of the human readable representation of the internal webpage 304. If the user clicks on the clickable representation of the link 308, the browser generates an HTTP request for the page referenced by the link 308, and sends the request to the external website. The browser may include an HTTP referer field with the request. The HTTP referer field includes information that identifies the source of the hyperlink. In the example of FIG. 3, the HTTP referer field may include the fully qualified domain name of the internal Web server. In some examples, the information in the HTTP referer field may include path information and URL encoded parameters associated with the internal Web server.

Information contained in the HTTP referer field may be harvested by a hostile entity and used to infer architectural information and network topology of the internal Web server and internal network. For example, some organizations organize internal Web servers with a file structure that corresponds to the organizational structure of the organization. The name of the internal Web server may correspond to an internal project name, owner, or business group. Parameters within the HTTP referer field may include usernames, passwords, or other indications of what the user was doing when the hyperlink was clicked.

Figure 4:
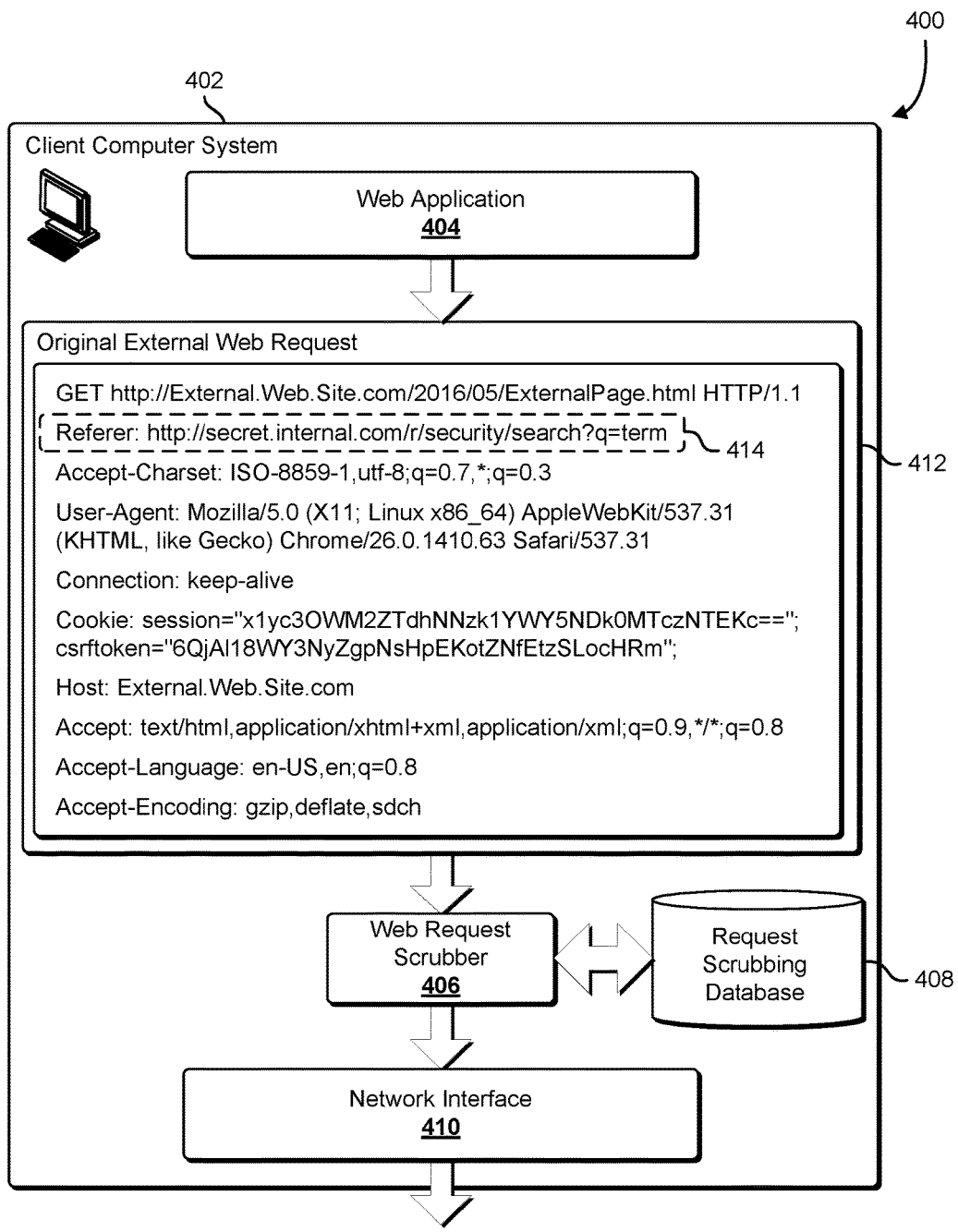
FIG. 4 shows an illustrative example of a web request generated by an application on a client computer system that includes an HTTP referer field.

FIG. 4 shows an illustrative example of a web request generated by an application on a client computer system that includes an HTTP referer field. A diagram 400 shows a client computer system 402 that generates a web request in response to a user clicking a hyperlink on an internal webpage. The client computer system 402 includes a web application 404 such as a web browser. The user interacts with the web application 404 and causes the web application 404 to generate a web request that includes an HTTP referer field. In many examples, the web application 404 is a web browser, and the user clicks a hyperlink on an internal webpage hosted by an internal website where the hyperlink references an extra webpage hosted by an external website. The web application 404 attempts to deliver the web request to a destination Web server, but the request is intercepted by a web request scrubber 406.

In some implementations, the web request scrubber 406 is a network-traffic-processing layer within a networking stack installed between a network API accessible to the web application 404 and the network interface 410. The web application 404 makes calls to the network API to establish and close network connections, and to transmit and receive information via the network interface 410. In some implementations, the web request scrubber 406 installs itself as a network layer in the protocol stack of the client computer system 402. The web request scrubber 406 intercepts the calls to the original network layer, and relays calls made to the web request scrubber 406 to an original network layer in either a modified or original form. If web request scrubber 406 detects the presence of the HTTP referer field, using information maintained in a request scrubbing database 408, the web request scrubber 406 identifies a scrubbing policy based at least in part on the intended destination of the HTTP referer field. The scrubbing policy describes how the information in the HTTP referer field may be modified to reduce the chances of unintended data exfiltration. The information in the HTTP referer field is modified in accordance with the scrubbing policy and forwarded to the intended destination via the network interface 410.

In the example shown in FIG. 4, the web application 404 generates an original external web request 412. The original external web request 412 is generated as a result of the user clicking a hyperlink on an internal webpage hosted on an internal website. The original external web request 412 includes an HTTP referer field 414. The HTTP referer field 414 includes information that reveals that the internal website has a fully qualified domain name of "secret.internal.com" and the internal webpage is located at a path of "/r/security/." The HTTP referer field 414 also includes a parameter submitted by the user to the internal webpage.

Figure 5:
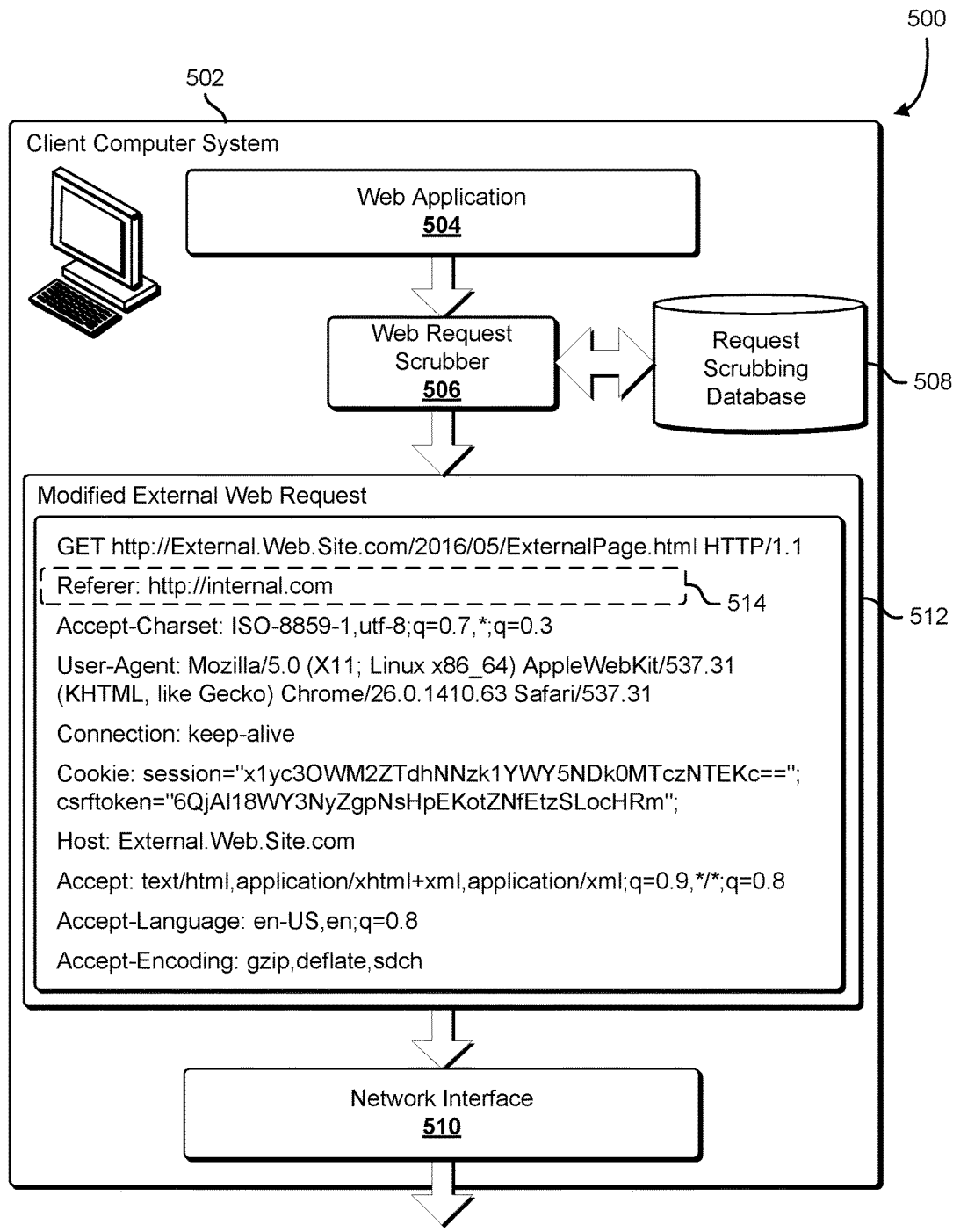
FIG. 5 shows an illustrative example of a modified web request altered by a web request scrubber and sent to an external website by a client computer system.

FIG. 5 shows an illustrative example of a modified web request altered by a web request scrubber and sent to an external website by a client computer system. A diagram 500 shows a client computer system 502 that generates a scrubbed web request in response to a user clicking a hyperlink on an internal webpage. The client computer system 502 includes a web application 504 such as a web browser. The user interacts with the web application 504 and causes the web application 504 to generate a web request that includes an HTTP referer field. In many examples, the web application 504 is a web browser, and the user clicks a hyperlink on an internal webpage hosted by an internal website where the hyperlink references an extra webpage hosted by an external website. The web application 504 attempts to deliver the web request to a destination Web server, but the request is intercepted by a web request scrubber 506. The web request scrubber 506 detects the presence of the HTTP referer field, and based at least in part on information contained in a request scrubbing database 508, modifies the web request to reduce the potential for unintentional data exfiltration.

If the web request scrubber 506 detects the presence of an HTTP referer field that contains sensitive information in the web request, the web request scrubber 506 may perform a number of modifications to the information in the HTTP referer field to reduce the amount of sensitive information in the web request. In some implementations, the web request scrubber 506 examines the HTTP referer field for the presence of sensitive username or password information. If the web request scrubber 506 detects the presence of sensitive username or password information, such information is removed from the HTTP referer field regardless of the intended destination of the web request. In another implementation, the web request scrubber 506 identifies the intended destination of the web request, and based at least in part on the intended destination of the web request, identifies one or more applicable scrubbing policies. A scrubbing policy may be identified by comparing the intended destination of the web request to a list of destination names, a list of destination-name wildcards, a list of destination addresses, a list of network subnets, or a list of destination address ranges that are associated with the scrubbing policy.

When a particular scrubbing policy is identified by the web request scrubber 506 as being applicable to the intended destination of the web request, the particular scrubbing policy is applied to the HTTP referer field of the web request. In some examples, the particular scrubbing policy causes the web request scrubber 506 to remove any parameters from a URL in the HTTP referer field. In another example, the particular scrubbing policy causes the web request scrubber 506 to remove all information from the HTTP referer field. In yet another example, the particular scrubbing policy causes the web request scrubber 506 to remove the HTTP referer field entirely. In yet another example, the particular scrubbing policy causes the web request scrubber 506 to remove the hostname from a fully qualified domain name in the HTTP referer field. In yet another example, the particular scrubbing policy causes the web request scrubber 506 to replace the HTTP referer field with a generic domain name associated with the owner of the internal network. In yet another example, the particular scrubbing policy causes the web request scrubber 506 replace the HTTP referer field with a randomly generated identifying information, and the web request scrubber 506 records the randomly generated identifying information in association with the intended destination of the web request. If an administrator detects that the randomly generated identifying information is being used as part of an attack, the administrator may refer to the recorded information to identify the recipient of the randomly generated identifying information.

In the example shown in FIG. 5, the web application 504 generates an original external web request which is intercepted by the web request scrubber 506. The original external web request is generated as a result of the user clicking a hyperlink on an internal webpage hosted on an internal website. The original external web request includes an original HTTP referer field. The web request scrubber 506 intercepts the original external web request including the original HTTP referer field. The web request scrubber 506 identifies the intended destination of the original web request, and modifies the information in the original HTTP referer field in accordance with one or more scrubbing policies that are based on the intended destination. The web request scrubber 506 forwards, via a network interface 510, a modified external web request 512 to the intended recipient. The modified external web request 512 includes a modified HTTP referer field 514. The modified HTTP referer field includes information that is limited by the one or more scrubbing policies to reduce the likelihood that sensitive information will be provided to the intended recipient of the web request. In the examples shown in FIGS. 4 and 5, the HTTP referer field is modified from "http://secret.internal.com/r/security/search?q=term" to "http://internal.com."

Figure 6:
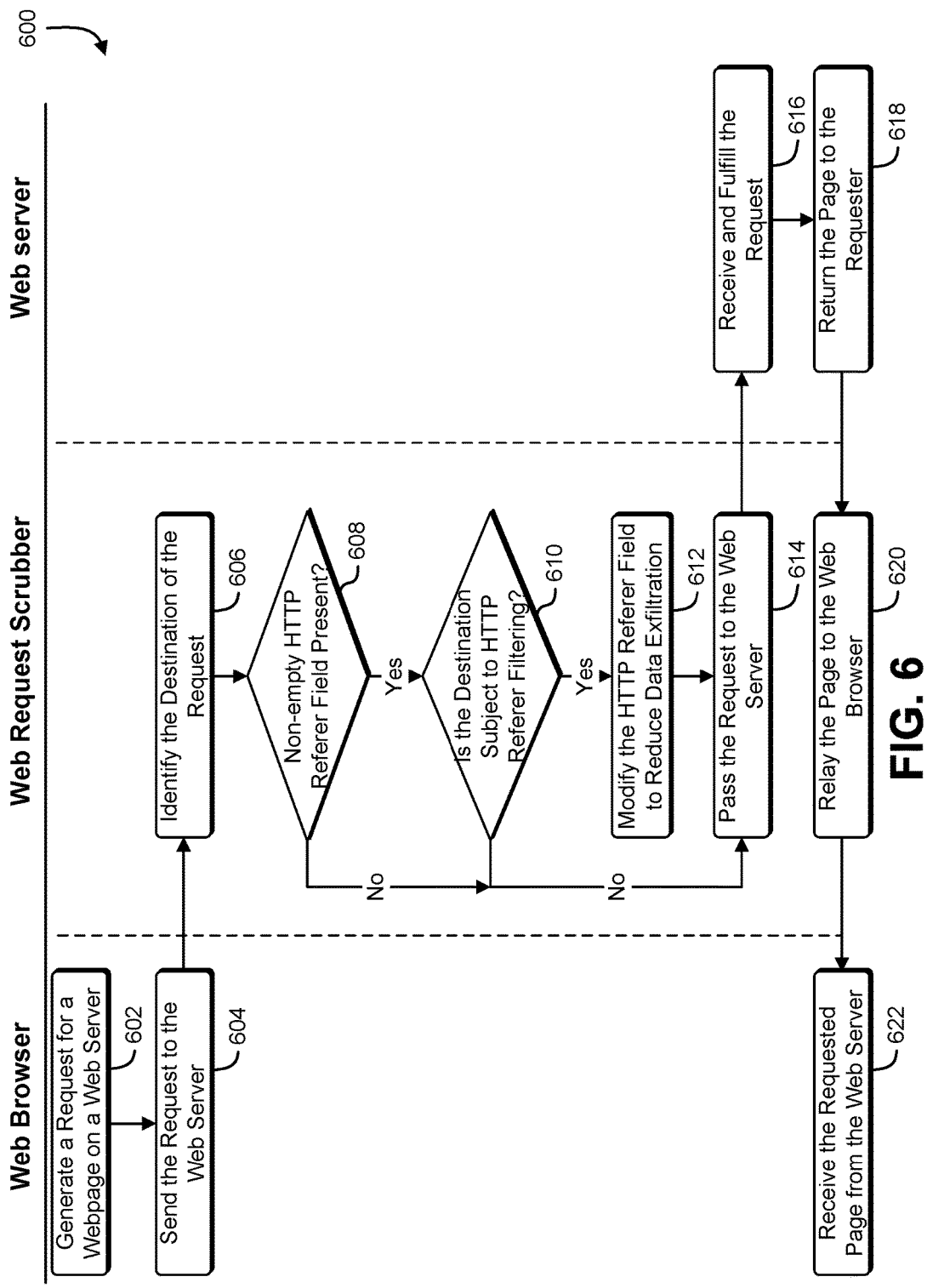
FIG. 6 shows an illustrative example of a process that, as a result of being performed by a web browser, a web request scrubber, and a Web server, generates a web request and scrubs information from an HTTP referer field in the web request based at least in part on the intended destination for the request.

FIG. 6 shows an illustrative example of a process that, as a result of being performed by a web browser, a web request scrubber, and a Web server, generates a web request and scrubs information from a referer field in the web request based at least in part on the intended destination for the request. A swim diagram 600 illustrates a process that begins at block 602 with the web browser generating a web request for retrieving a webpage from a Web server. The web request may be generated as a result of a user clicking on a hyperlink on another webpage retrieved from another Web server. At block 604, the web browser attempts to send the web request to the Web server. In some implementations, the web browser attempts to send the web request to the Web server by calling a network API and requesting establishment of a network connection from the web browser to the Web server, and sending the web request over the resulting network connection.

At block 606, the web request scrubber intercepts the web request sent by the web browser, and identifies the intended destination of the web request. The web request scrubber examines the web request and determines whether a non-empty HTTP referer field is present in the web request. At decision block 608, if the web request does not include a non-empty HTTP referer field, execution bypasses the web request scrubbing logic and advances to block 614. If the web request does include a non-empty HTTP referer field, execution advances to decision block 610, and the web request scrubber determines whether the intended destination of the web request is subject to HTTP referer filtering. In some implementations, web-request-scrubbing policies are maintained in a request scrubbing database, and individual web-request-scrubbing policies are stored in association with a number of destination names, destination name wildcards, network address ranges, network addresses, and subnets that identify a set of request destinations. If the intended destination is subject to at least one web-request-scrubbing policy, intended destination is subject to HTTP referer filtering. In another implementation, the web request scrubber maintains a whitelist of potential request destinations. If the intended destination is represented in the whitelist of potential request destinations, the intended destination is not subject to HTTP referer filtering. If the intended destination is not subject to HTTP referer filtering, execution bypasses the modification of the web request and advances to block 614.

If the intended destination is subject to HTTP referer filtering, execution advances to block 612 and the web request scrubber modifies the HTTP referer field. In some implementations, the web request scrubber modifies the information in the HTTP referer field in accordance with one or more web-request-scrubbing policies identified at decision block 610. In another implementation, the web request scrubber modifies the information in the HTTP referer field by replacing the information in the HTTP referer field with a general domain name. In yet another implementation, the web request scrubber modifies the information in the HTTP referer field by removing a hostname from a fully qualified hostname in the HTTP referer field, and removing paths and parameters from the HTTP referer field. At block 614, the web request scrubber forwards the modified web request with the modified HTTP referer field to the intended destination.

At block 616, the Web server receives the modified web request with the modified HTTP referer field. The Web server fulfills the web request by retrieving the requested web content and returning 618 the web content to the web browser. The web request scrubber receives 620 the web content, and releases the web content to the web browser, and at block 622, the web browser receives the requested page from the website.

Figure 7:
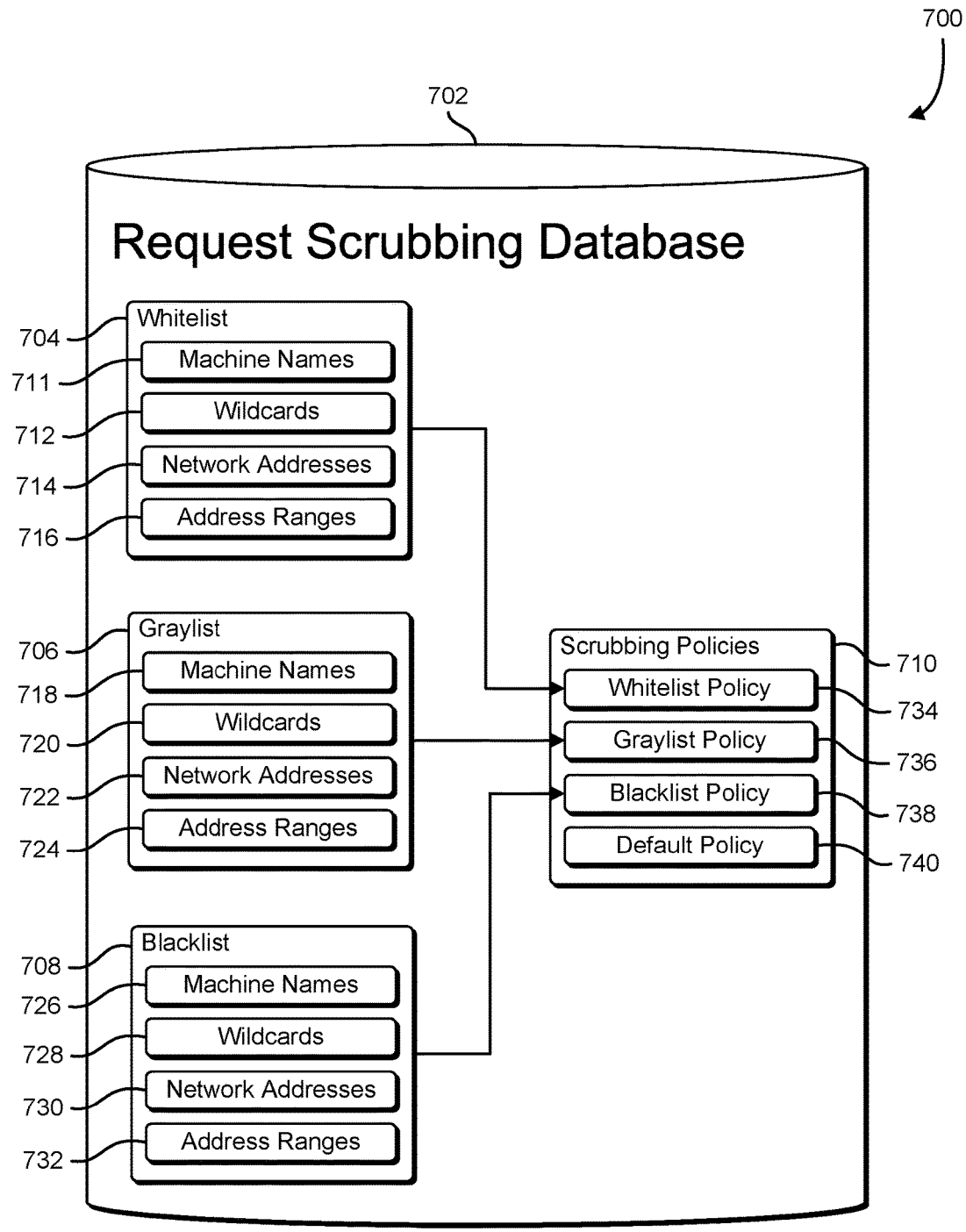
FIG. 7 shows an illustrative example of a request scrubbing database that retains a whitelist, a graylist, a blacklist, and associated scrubbing policies, usable by a web request scrubber to remove information from the HTTP referer field of a web request.

FIG. 7 shows an illustrative example of a request scrubbing database that retains a whitelist, a graylist, and a blacklist and associated scrubbing policies, usable by a web request scrubber to remove information from the referer field of a web request. A diagram 700 shows a request scrubbing database 702 that retains a collection of scrubbing policies 710 in association with a whitelist 704, a graylist 706, and a blacklist 708. The request scrubbing database 702 may be implemented using a database server, a file system, or memory storage device accessible to the web request scrubber. When the web request scrubber intercepts a web request, the web request scrubber identifies an intended destination associated with the web request. The web request scrubber determines whether the set of destinations described in each list includes the intended destination.

The set of destinations described by each list may be specified using individual machine names, machine-name wildcards, individual network addresses, and network address ranges. The whitelist 704 includes a machine name list 711, a wildcard name list 712, a network address list 714, and an address range list 716. The graylist 706 includes a machine name list 718, a wildcard name list 720, a network address list 722, and an address range list 724. The blacklist 708 includes a machine name list 726, a wildcard name list 728, a network address listed 730, and an address range list 732. The machine name lists may include a list of machine names or fully qualified machine names. The wildcard name lists may include partial machine names or partially defined, fully qualified machine names that include text-matching wildcards. Each wildcard name in the wildcard name list may match a plurality of potential web request destinations. The network address lists may include network addresses associated with particular request destinations. The network addresses may be in the form of an IP address, hardware address, an IPX address, or other network identifier associated with a destination. The network address range lists include network address ranges. A network address range may be specified as a numerical range of network addresses or as a network address that includes wildcards or pattern matching as part of the specification of the network address.

The collection of scrubbing policies 710 includes a scrubbing policy linked to each list and a default policy that is applied if the intended destination of a web request is not represented in any list in the request scrubbing database 702. The collection of scrubbing policies 710 includes a whitelist policy 734, a graylist policy 736, a blacklist policy 738, and a default policy 740. Each policy in the collection of scrubbing policies 710 describes how information contained in an HTTP referer field may be modified, limited, or eliminated. If a particular web request destination is represented in the whitelist 704, the whitelist policy 734 is applied to the information in the HTTP referer field of a request sent to the particular web request destination. If a particular web request destination is represented in the graylist 706, the graylist policy 736 is applied to the information in the HTTP referer field of a request sent to the particular web request destination. If a particular web request destination is represented in the blacklist 708, the blacklist policy 738 is applied to the information in the HTTP referer field of a request sent to the particular web request destination. If a particular web request destination is not represented in any list retained in the request scrubbing database 702, a default policy 740 may be applied to requests sent to the particular web request destination.

In some examples, the default policy may be applied to all web requests intercepted by a web request scrubber. In some implementations, the default policy specifies that passwords that are detected within an HTTP referer field are modified before being forwarded to an intended destination. In another implementation, the default policy specifies that passwords that are detected within an HTTP referer field are removed before being forwarded to an intended recipient. In yet another example, the default policy specifies that usernames that are detected in an HTTP referer field are modified or removed before being forwarded to an intended recipient.

Figure 8:
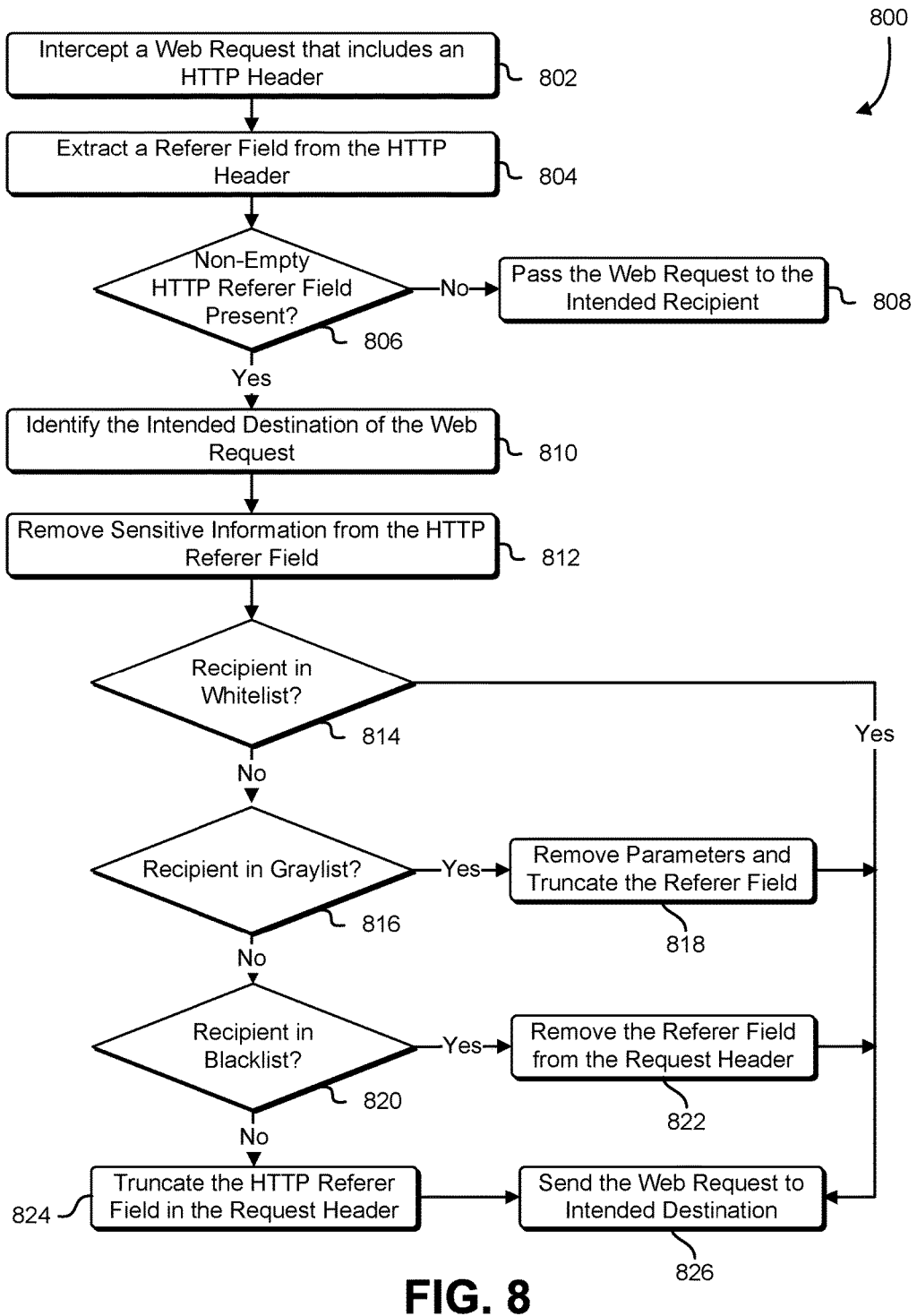
FIG. 8 shows an illustrative example of a process that, as a result of being performed by a web request scrubber, intercepts a web request, and removes information from an associated HTTP referer field based at least in part on the intended destination of the request.

FIG. 8 shows an illustrative example of a process that, as a result of being performed by a web request scrubber, intercepts a web request, and removes information from an associated HTTP referer field based at least in part on the intended destination of the request. A flowchart 800 illustrates a process that begins at block 802 with the web request scrubber intercepting the web request that includes an HTTP header. In some implementations, the web request scrubber intercepts the web request by acting as a network layer within a network stack of a client computer system. Calls to the network stack are intercepted by the web request scrubber, examined, and forwarded to the original network layer of the client computer system. In another implementation, the web request scrubber is a nonexclusive consumer of data transmitted over named pipe, that shares access to the named pipe with the network stack of the client computer. At block 804, the web request scrubber parses the information in the HTTP header, and attempts to locate an HTTP referer field. At decision block 806, if the web request scrubber determines that a non-empty HTTP referer field is not present in the HTTP header, execution proceeds to block 808, and the web request scrubber forwards the web request to the intended recipient. In some implementations, the web request scrubber forwards the web request by making a call to the network layer of the client computer system.

If the web request scrubber determines that a non-empty HTTP referer field is present in the HTTP header, execution advances to block 810 and the web request scrubber identifies an intended recipient associated with the web request. In some examples, the intended recipient is an external Web server. In another example, the intended recipient is a web service. In yet another example, the intended recipient is a plurality of Web servers associated with a website. In some implementations, the intended recipient of the web request is included in the content of the web request. In another implementation, the intended recipient of the web request is included in a parameter of a network call intercepted by the web request scrubber.

At block 812, the web request scrubber examines the information in the HTTP referer field and identifies sensitive information that may be present. The sensitive information may be cryptographic keys, passwords, usernames, cookies, digital certificates, financial or credit card information, or other information contained in fully qualified domain names, paths, or parameters of the HTTP referer field. If the web request scrubber identifies sensitive information, the web request scrubber removes the information from the HTTP referer field.

At decision block 814, the web request scrubber determines whether the intended recipient is represented in a whitelist maintained by the web request scrubber. The whitelist may be maintained in a database, data store, in-memory array, or remote storage device. The whitelist contains a combination of destination names, addresses name ranges, name wildcards, address ranges, and address wildcards that define a set of intended destinations. If the intended destination is in the set of intended destinations defined by the whitelist, execution advances to block 826 where the web request scrubber forwards the modified web request to the intended destination.

If the intended destination is not in the set of intended destinations defined by the whitelist, execution advances to decision block 816, and the web request scrubber determines whether the intended destination is in a set of destinations defined by a graylist. The graylist may be maintained in a database, data store, in memory array, or remote storage device. The graylist may include a combination of destination names, addresses name ranges, name wildcards, address ranges, and address wildcards that define a set of intended destinations. If the intended destination is in the set of intended destinations defined by the graylist, execution advances to block 818 and the web request scrubber removes parameters and path information from the information contained in the HTTP referer field. After the web request scrubber removes the parameters and path information from the information contained in the HTTP referer field, execution advances to block 826 and the request is forwarded to the intended destination.

If the intended destination is not in the set of intended destinations defined by the graylist, execution advances to decision block 820, and the web request scrubber determines whether the intended destination is in a set of destinations defined by a blacklist. The blacklist may include a combination of destination names, addresses name ranges, name wildcards, address ranges, and address wildcards that define a set of intended destinations. If the intended destination is in the set of intended destinations defined by the blacklist, execution advances to block 822 and the web request scrubber removes the HTTP referer field from the HTTP request header. In some examples, the web request scrubber removes the information from the HTTP referer field without removing the field from the HTTP request header. After the web request scrubber removes the information from the HTTP referer field, execution advances to block 826 and the request is forwarded to the intended destination.

If the intended destination is not in the set of intended destinations defined by the blacklist, execution advances to block 824. At block 824, the web request scrubber may determine if other lists are applicable and apply corresponding modifications to the information in the HTTP referer field. In the example shown in FIG. 8, the web request scrubber performs default modifications to the HTTP referer field. The default modifications to the HTTP referer field includes truncating fully qualified host names to include only the organization domain name. In some implementations, the information in the HTTP referer field is replaced with a generic domain name. After applying all modifications to the HTTP referer field, execution advances to block 826 and the web request scrubber sends the modified web request to the intended destination.

Figure 9:
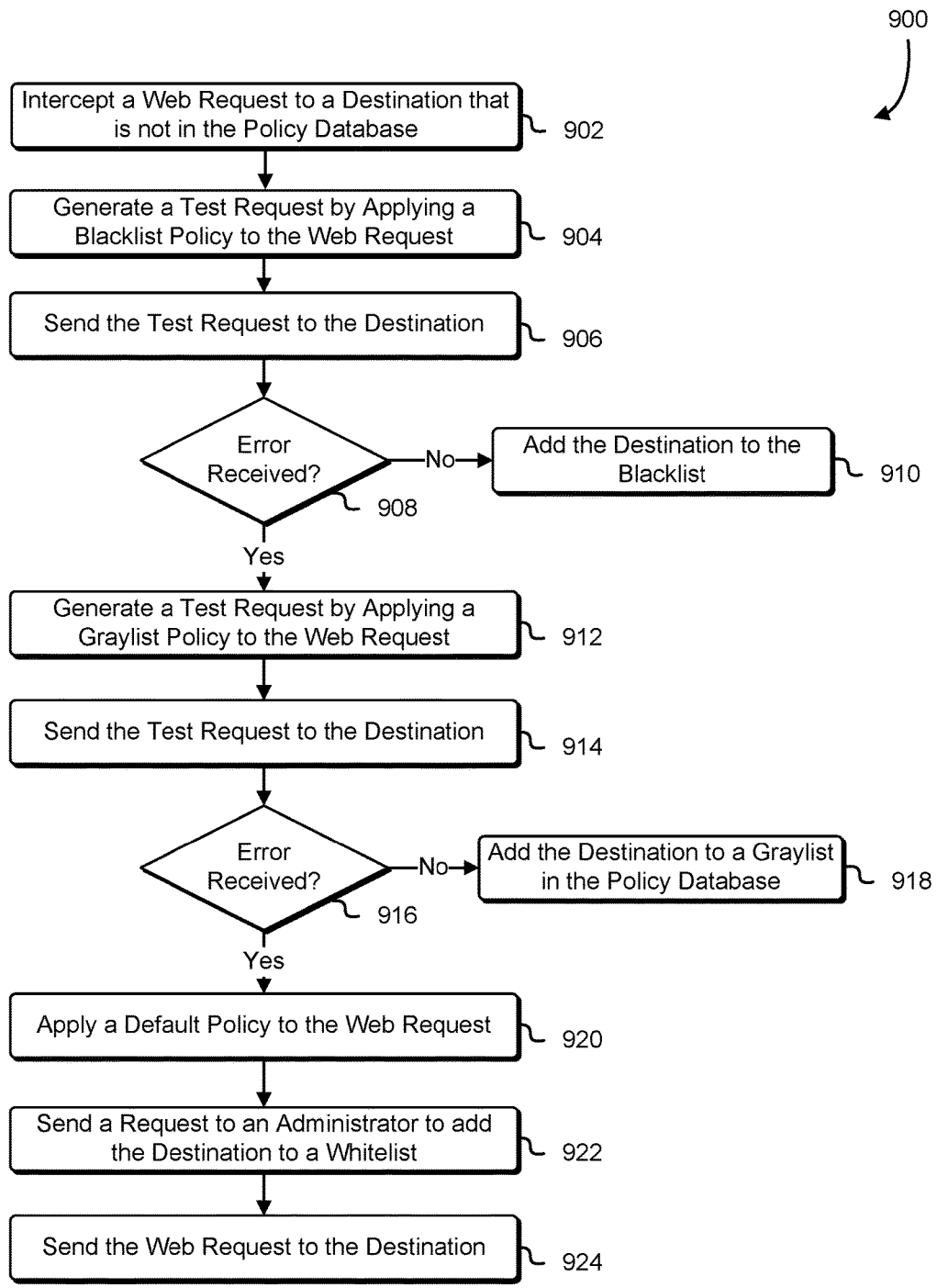
FIG. 9 shows an illustrative example of a process that, as a result of being performed by a web request scrubber, determines an appropriate request scrubbing policy for an intended destination.

FIG. 9 shows an illustrative example of a process that, as a result of being performed by a web request scrubber, determines an appropriate request scrubbing policy for an intended destination. A flowchart 900 shows a process that begins at block 902 with a web request scrubber intercepting a web request to an intended destination. The web request scrubber queries a request scrubbing database and attempts to identify a scrubbing policy that is applicable to the destination, but determines that the intended destination is not associated with any scrubbing policy available to the web request scrubber. At block 904, the web request scrubber retrieves a scrubbing policy associated with a blacklist from the request scrubbing database, and generates a test web request using the scrubbing policy that is applicable to the blacklist. The test web request is generated by modifying a copy of the web request, the modified copy having an HTTP referer field modified in accordance with the scrubbing policy that is applicable to the blacklist. The web request scrubber sends 906 the test web request to the intended destination of the web request. At decision block 908, if the web request scrubber does not receive an error as a result of sending the test web request to the intended destination of the web request, execution advances to block 910 where the intended destination is added to the blacklist. If the web request scrubber receives an error as a result of sending the test web request to the intended destination, execution advances to block 912.

At block 912, the web request scrubber retrieves a scrubbing policy associated with a graylist from the request scrubbing database, and generates a test web request using the scrubbing policy that is applicable to the graylist. The test web request is generated by modifying a copy of the web request, the modified copy having an HTTP referer field modified in accordance with the scrubbing policy that is applicable to the graylist. The web request scrubber sends 914 the test web request to the intended destination of the web request. At decision block 916, if the web request scrubber does not receive an error as a result of sending the test web request to the intended destination of the web request, execution advances to block 918 where the intended destination is added to the graylist. If the web request scrubber receives an error as a result of sending the test web request to the intended destination, execution advances to block 920.

At block 920, the web request scrubber applies a default scrubbing policy to the HTTP referer field of the web request. In some examples, the default scrubbing policy removes path information and critical parameters from the HTTP referer field, and removes host information from fully qualified domain names in the HTTP referer field. In another example, the default scrubbing policy applies a scrubbing policy associated with the blacklist. In yet another example, the default scrubbing policy applies a scrubbing policy associated with the graylist. At block 922, the web request scrubber sends a request to an administrator requesting that the intended destination be added to a whitelist that allows a more permissive scrubbing policy to be applied to the HTTP referer field of the web request. The request may be provided to the administrator via an administrative console, an email message, or text message on a mobile device. If the administrator approves the request, the web request scrubber adds the intended destination to a whitelist. If the administrator denies the request, the intended destination is not added to the whitelist. At block 924, after the default policy has been applied to the HTTP referer field of the web request, the web request scrubber sends the web request to the intended destination.

In some examples, the web request scrubber provides a notification to an administrator that the intended destination has been added to the blacklist, the graylist, or other set of intended destinations. In some implementations, the notification is provided to the administrator via an administrative console that is in communication with the web request scrubber. In another implementation, the notification is provided to the administrator via a text message or email. In yet another implementation, the notification is provided to the administrator in a report, and the report is accessible to the administrator via a web interface.

Figure 10:
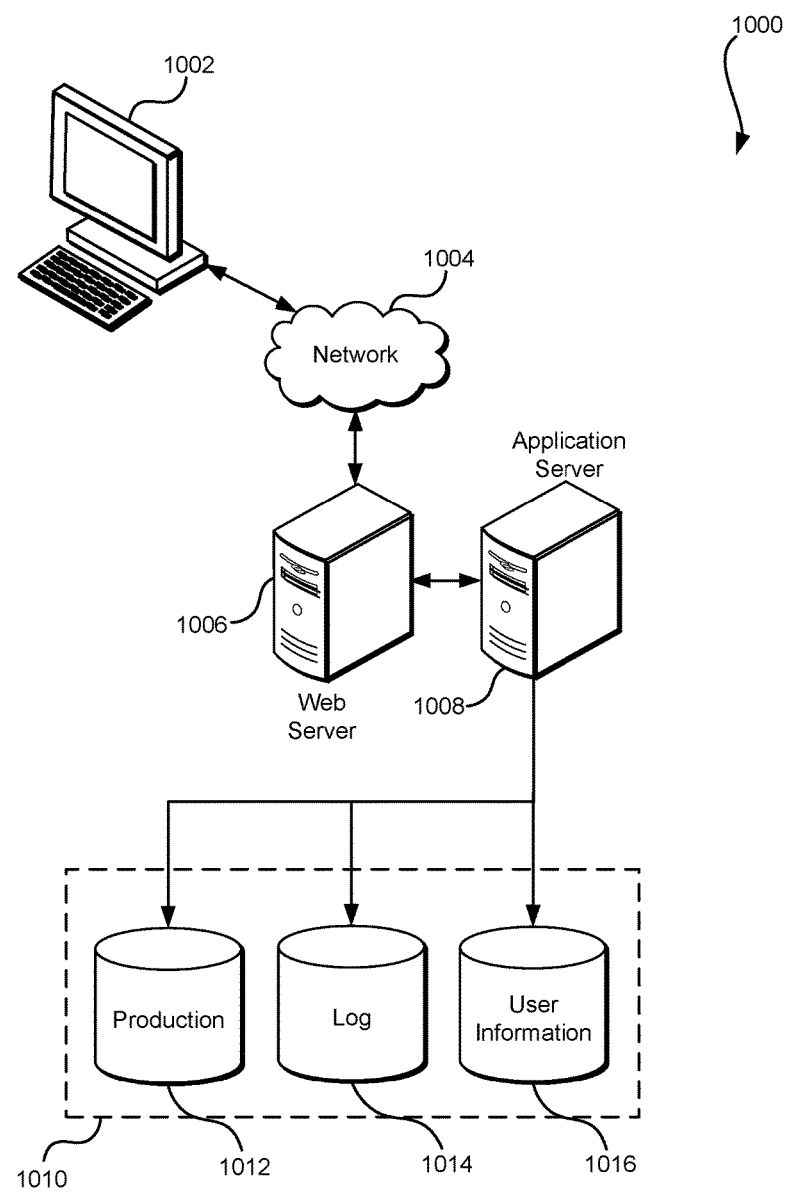
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the Web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the Web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a webpage that the user is able to view via a browser on the client device 1002. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
intercepting an HTTP request sent to a network application programming interface by an application running on a client computer system;
determining that the HTTP request includes a non-empty HTTP referer field; and
as a result of having determined that the HTTP request includes the non-empty HTTP referer field:
identifying an HTTP-referer-scrubbing policy based at least in part on an intended destination of the HTTP request;
producing a modified HTTP request by at least modifying information in the non-empty HTTP referer field in accordance with the HTTP-referer-scrubbing policy;
modifying the non-empty HTTP referer field to include a piece of tracking information, the piece of tracking information being traceable to the intended destination of the HTTP request; and
sending the modified HTTP request to the intended destination of the HTTP request via a network interface on the client computer system.

2. The computer-implemented method of claim 1, wherein:
the HTTP-referer-scrubbing policy is associated with a set of destination names, a set of destination addresses, a set of destination name wildcards, a set of destination address ranges, a set of network subnets, or a set of network domains; and
the intended destination of the HTTP request matches the set of destination names, the set of destination addresses, the set of destination name wildcards, the set of destination address ranges, the set of network subnets, or the set of network domains.

3. The computer-implemented method of claim 1, wherein:
identifying the HTTP-referer-scrubbing policy is accomplished at least in part by determining that the intended destination of the HTTP request is represented in a blacklist; and
modifying the information in the non-empty HTTP referer field in accordance with the HTTP-referer-scrubbing policy is accomplished at least in part by removing hostname information from the non-empty HTTP referer field in the HTTP request.

4. The computer-implemented method of claim 1, wherein modifying the information in the non-empty HTTP referer field in accordance with the HTTP-referer-scrubbing policy is accomplished at least in part by removing path information from the non-empty HTTP referer field, removing parameters from the non-empty HTTP referer field, or truncating host name information from the non-empty HTTP referer field.

5. A system, comprising a computing device configured to implement a request scrubber, wherein the request scrubber is configured to:
acquire, via a network application programming interface on the computing device, a web request generated by an application and submitted by the application to the network application programming interface;
identify a request-scrubbing policy based at least in part on an intended destination of the web request, the request-scrubbing policy describing a limitation on information included with the web request;
modify the information included with the web request to include a piece of tracking information that is associated with the intended destination of the web request, in accordance with the request-scrubbing policy to produce a modified web request; and
cause the modified web request to be transmitted to the intended destination of the web request by at least providing the modified web request to a network interface on the computing device.

6. The system of claim 5, wherein the request scrubber is further configured to:
identify an additional request-scrubbing policy based at least in part on the intended destination of the web request, the additional request-scrubbing policy describing an additional limitation on the information included with the web request; and
modify the information included with the modified web request in accordance with the additional request-scrubbing policy.

7. The system of claim 5, wherein the request scrubber is further configured to:
search a policy database for an applicable request-scrubbing policy, the policy database including a set of request-scrubbing policies, individual request-scrubbing policies stored in association with sets of potential web-request destinations;
determine that the intended destination of the web request is not in the sets of potential web-request destinations; and
as a result of having determined that the intended destination of the web request is not in the set of potential web-request destinations, apply a default web-scrubbing policy to the web request.

8. The system of claim 5, wherein the request scrubber is further configured to:
search a policy database for an applicable request-scrubbing policy, the policy database including a set of request-scrubbing policies, individual request-scrubbing policies stored in association with sets of potential web-request destinations;
determine that the intended destination of the web request is not in the sets of potential web-request destinations; and
as a result of having determined that the intended destination of the web request is not in the sets of potential web-request destinations:
select a particular request-scrubbing policy from the set of request-scrubbing policies;
generate a test web request by modifying the web request in accordance with the particular request-scrubbing policy;
send the test web request to the intended destination of the web request;
determine that the test web request was successfully fulfilled by the intended destination; and
as a result of having determined that the test web request was successfully fulfilled, add the intended destination to a particular set of potential web-request destinations associated with the particular request-scrubbing policy.

9. The system of claim 8, wherein the request scrubber is further configured to:
as a result of having determined that the intended destination of the web request is not in the sets of potential web-request destinations:
in response to the test web request being sent to the intended destination, receiving an error from the intended destination; and as a result of having received the error message, providing a request to an administrator, the request requesting that the request scrubber be allowed to provide future web requests to intended destination without modification.

10. The system of claim 8, wherein the request scrubber is further configured to provide a notification to an administrator, the notification indicating that the intended destination was added to the set of potential web-request destinations associated with the particular request-scrubbing policy.

11. The system of claim 5, wherein:
the request-scrubbing policy is identified at least by identifying a network subnet associated with the request-scrubbing policy; and
determining that the intended destination of the web request is in the network subnet.

12. The system of claim 5, wherein:
the application is a web browser;
the web request is generated by the web browser in response to a user selecting a hyperlink that references a webpage on a website;
the web request includes information that identifies the webpage and the website; and
the modified web request does not include the information that identifies the webpage and the website.

13. The system of claim 5, wherein:
the application is a web browser;
the web request is generated by the web browser in response to a user selecting a hyperlink that references a webpage on a website;
the web request includes an HTTP referer field that includes at least one parameter in addition to information that identifies the webpage and the website; and
the modified web request does not include the at least one parameter.

14. A non-transitory computer-readable storage medium having stored thereon executable instructions that, as a result of being executed by one or more processors of a computer system, cause the computer system to at least:
receive content from a server, the content including a hyperlink to a second content hosted by a second server;
based at least in part on the hyperlink, generate an HTTP request for the second content, the HTTP request including an HTTP referer field that includes information that identifies the content and the server;
determine that the second server is not in a set of trusted servers;
as a result of having determined that the second server is not in the set of trusted servers, modify content of the HTTP referer field by adding a piece of tracking information to the HTTP referer field, the piece of tracking information being traceable to the second server; and
send the HTTP request to the second server via a network interface on the computer system.

15. The non-transitory computer-readable storage medium of claim 14, wherein the instructions further comprise instructions that, as a result of being executed by the one or more processors, cause the computer system to remove, from the HTTP referer field, information that identifies the server and the content.

16. The non-transitory computer-readable storage medium of claim 14, wherein:
the HTTP referer field includes a fully qualified domain name associated with the server; and
the instructions further comprise instructions that, as a result of being executed by the one or more processors, cause the computer system to remove the name of the server from the fully qualified domain name.

17. The non-transitory computer-readable storage medium of claim 14, wherein:
the server and the computer system are located on a trusted internal computer network;
the set of trusted servers is a set of servers connected to the trusted internal computer network; and
the instructions that cause the computer system to determine that the second server is not in the set of trusted servers further include instructions that cause the computer system to determine that the second server is not located on the trusted internal computer network.

18. The non-transitory computer-readable storage medium of claim 14, wherein the instructions further comprise instructions that, as a result of being executed by the one or more processors, cause the computer system to:
determine that the second server is in the set of trusted servers; and
as a result of having determined that the second server is in the set of trusted servers, send the HTTP request to the second server via the network interface on the computer system without modifying the HTTP referer field of the HTTP request.

19. The non-transitory computer-readable storage medium of claim 14, wherein the instructions further comprise instructions that, as a result of being executed by the one or more processors, cause the computer system to:
determine that the second server is in a set of blacklisted servers; and
wherein the piece of tracking information is added to the HTTP referer field as a result of having determined that the second server is in the set of blacklisted servers.

20. The non-transitory computer-readable storage medium of claim 14, wherein the instructions further comprise instructions that, as a result of being executed by the one or more processors, cause the computer system to:
identify a query string in the HTTP referer field that includes sensitive information; and
modify the query string to obscure the sensitive information.

21. The non-transitory computer-readable storage medium of claim 20, wherein:
the sensitive information is a password; and
the query string is modified by removing the password from the query string from the HTTP referer field.

* * * * *